US012617268B2

(12) United States Patent  
Bessho

(10) Patent No.: US 12,617,268 B2  
(45) Date of Patent: May 5, 2026

(54) WORK VEHICLE

(71) Applicant: Kubota Corporation, Osaka (JP)

(72) Inventor: Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 19/185,492

(22) Filed: Apr. 22, 2025

(65) Prior Publication Data

US 2025/0340111 A1    Nov. 6, 2025

(30) Foreign Application Priority Data

May 2, 2024    (JP) ................................. 2024-074761

(51) Int. Cl.  
B60K 17/06 (2006.01)  
B62D 63/04 (2006.01)  
F16H 37/08 (2006.01)

(52) U.S. Cl.  
CPC .............. B60K 17/06 (2013.01); B62D 63/04 (2013.01); F16H 37/0813 (2013.01)

(58) Field of Classification Search  
CPC ...... B60K 17/06; B62D 63/04; F16H 37/0813  
See application file for complete search history.

(56) References Cited

U.S. PATENT DOCUMENTS

| 2017/0138450 | A1* | 5/2017 | Hart ....................... F16H 37/022 |
| 2018/0264928 | A1* | 9/2018 | Takaki .................... B60L 50/15 |
| 2023/0062469 | A1* | 3/2023 | Manji ..................... B60T 7/045 |

FOREIGN PATENT DOCUMENTS

JP        200381144 A    3/2003

* cited by examiner

*Primary Examiner* — Jason D Shanske  
*Assistant Examiner* — Matthew James O'Neill  
(74) *Attorney, Agent, or Firm* — The Webb Law Firm

(57) ABSTRACT

A work vehicle includes a prime mover; a transmission device; and an axle. The transmission device includes first and second transmission sections. The first transmission section is switchable into a decelerating power transmission mode and an accelerating power transmission mode. The axle is driven at a first drive rate with the first transmission section in the accelerating power transmission mode and the second transmission section in a transmission mode for a maximum speed and at a second drive rate with the first transmission section in the decelerating power transmission mode and the second transmission section in the transmission mode for a maximum speed. The first drive rate is higher than the second drive rate.

4 Claims, 10 Drawing Sheets

Fig.4

WORK VEHICLE

CROSS-REFERENCE TO RELATED APPLICATION

This application claims priority to Japanese Patent Application No. 2024-074761 filed May 2, 2024, the disclosure of which is hereby incorporated by reference in its entirety.

BACKGROUND OF THE INVENTION

Field of the Invention

The present invention relates to a work vehicle.

Description of Related Art

Japanese Unexamined Patent Application Publication, Tokukai, No. 2003-081144 discloses a track (crawler travel device) including a drive wheel (sprocket) attachable to an axle (rear axle), a front guide wheel (front tension wheel), a rear guide wheel (rear rotation wheel), two or more ground wheels (ground rotation wheels), and a crawler belt.

SUMMARY OF THE INVENTION

There has been a demand for a work vehicle capable of traveling with use of not only wheels but also tracks (crawler travel devices). A track may include a drive wheel attachable to an axle. The drive wheel typically has an outer diameter smaller than that of a wheel. With tracks attached, a work vehicle travels at a speed lower than in the case of traveling with use of wheels, even in response to the axles being driven at a speed equal to that for the case of traveling with use of wheels. Such a work vehicle, which is capable of traveling at a restricted maximum speed with wheels attached, is only capable of traveling at a speed lower than the restricted maximum speed with tracks attached.

The present invention provides a work vehicle capable of traveling with use of tracks at a maximum travel speed equal to or not so different from a predetermined maximum travel speed as compared to the case of traveling with use of wheels.

A work vehicle according to the present invention includes: a prime mover; a transmission device configured to receive motive power from the prime mover, adjust the motive power, and output the motive power as adjusted; and an axle drivable by the motive power from the transmission device, the transmission device including a first transmission section and a second transmission section connected to each other in series in a motive power transmission system for transmitting the motive power from the prime mover to the axle, the first transmission section including: a first power transmission shaft upstream in a motive power transmission direction; a second power transmission shaft downstream in the motive power transmission direction; and a first power transmission wheel and a second power transmission wheel each detachably attachable to each of the first power transmission shaft and the second power transmission shaft, the first transmission section being switchable (i) in response to the first power transmission wheel being attached to the first power transmission shaft and the second power transmission wheel being attached to the second power transmission shaft, into a decelerating power transmission mode in which the first power transmission wheel and the second power transmission wheel decrease motive power transmitted from the first power transmission shaft to the second power transmission shaft and (ii) in response to the first power transmission wheel being attached to the second power transmission shaft and the second power transmission wheel being attached to the first power transmission shaft, into an accelerating power transmission mode in which the first power transmission wheel and the second power transmission wheel increase the motive power transmitted from the first power transmission shaft to the second power transmission shaft, the transmission device being switchable into (i) a first maximum speed power transmission mode in which the first transmission section is in the accelerating power transmission mode, and the second transmission section is in a transmission mode for a maximum speed and (ii) a second maximum speed power transmission mode in which the first transmission section is in the decelerating power transmission mode, and the second transmission section is in the transmission mode for a maximum speed, the transmission device being configured to, in the first maximum speed power transmission mode, cause the axle to be driven at a first drive rate and, in the second maximum speed power transmission mode, cause the axle to be driven at a second drive rate, the first drive rate being higher than the second drive rate.

The above configuration sets an appropriate difference between the drive rate of the axle in the first maximum speed power transmission mode and that in the second maximum speed power transmission mode on the basis of the difference between the outer diameter of each wheel and that of the drive wheel of each track (crawler travel device). The transmission device is switched into the first high-speed power-transmitting mode with the wheels attached and into the second high-speed power-transmitting mode with the tracks attached. This achieves an equal or substantially equal circumferential speed for both the wheels and the respective drive wheels of the tracks in response to the axles being driven at a maximum speed. The above configuration, in other words, achieves an equal or substantially equal travel speed for the work vehicle in both the case of driving the wheels at a maximum speed and the case of driving the tracks at a maximum speed. The work vehicle is therefore capable of traveling with use of tracks at a maximum travel speed equal to or not so different from a predetermined maximum travel speed as compared to the case of traveling with use of wheels.

The work vehicle may be further configured such that the first transmission section includes a first transmission section containing the first power transmission wheel and the second power transmission wheel, and the second transmission section includes a second transmission section separate from the first transmission case.

With the above configuration, simply opening the first transmission case alone allows the first and second power transmission wheels to be switched between the first and second power transmission shafts. This allows the first transmission section to be easily switched between the decelerating and accelerating power transmission modes.

The work vehicle may be further configured such that the first power transmission wheel is a first gear, and the second power transmission wheel is a second gear engageable with the first gear and having an outer diameter larger than an outer diameter of the first gear.

With the above configuration, engaging the first and second gears with each other allows motive power to be transmitted from the first power transmission shaft to the second power transmission shaft. This allows motive power to be transmitted from the first power transmission shaft to the second power transmission shaft without a loss regardless of which of the first and second gears is attached to which of the first and second power transmission shafts.

The work vehicle may be further configured such that the first power transmission wheel is a first belt pulley, and the second power transmission wheel is a second belt pulley coupled to the first belt pulley with use of an endless belt and having an outer diameter larger than an outer diameter of the first belt pulley.

The above configuration causes motive power to be transmitted from the first power transmission shaft to the second power transmission shaft with use of the first belt pulley, the endless belt, and the second belt pulley. This is an inexpensive mechanism for transmitting motive power from the first power transmission shaft to the second power transmission shaft.

BRIEF DESCRIPTION OF THE DRAWINGS

FIG. 4 is a plan view of an in-vehicle charger and a charging port.

DESCRIPTION OF THE INVENTION

The description below deals with an example embodiment of the present invention with reference to drawings.

Figure 1:
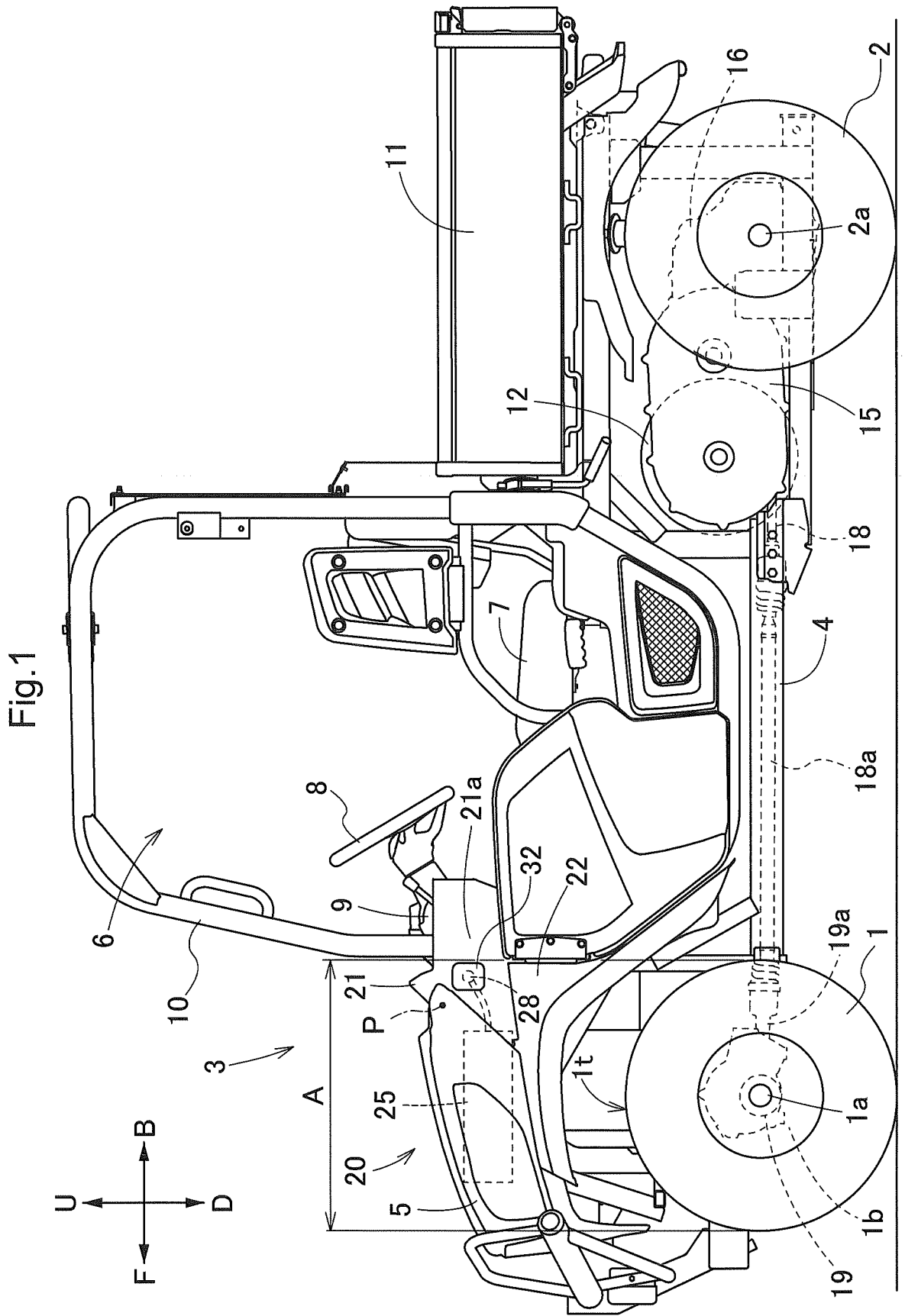
FIG. 1 is a left side view of a utility vehicle with front and rear wheels attached.
Figure 2:
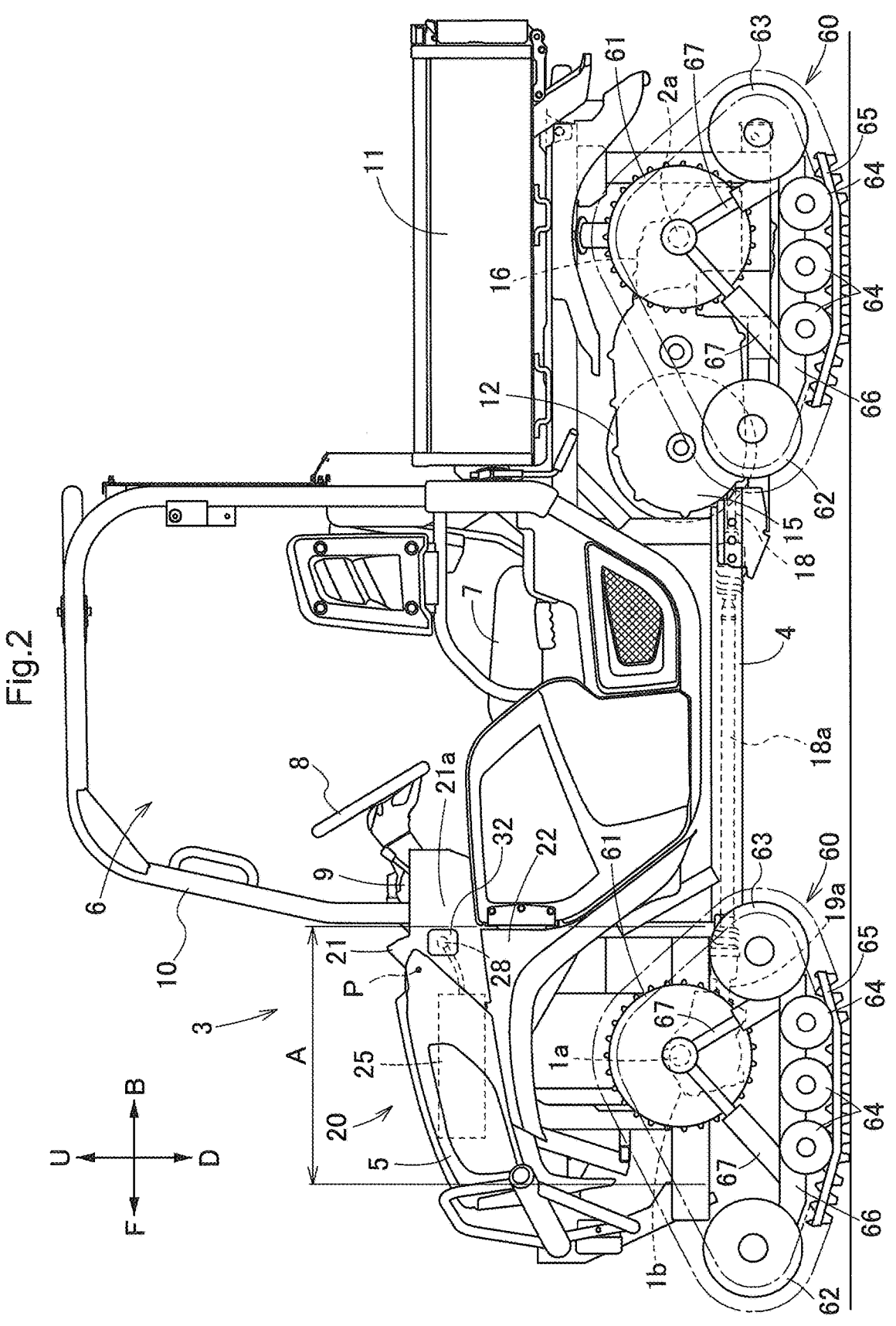
FIG. 2 is a left side view of a utility vehicle with tracks (crawler travel devices) attached.
Figure 3:
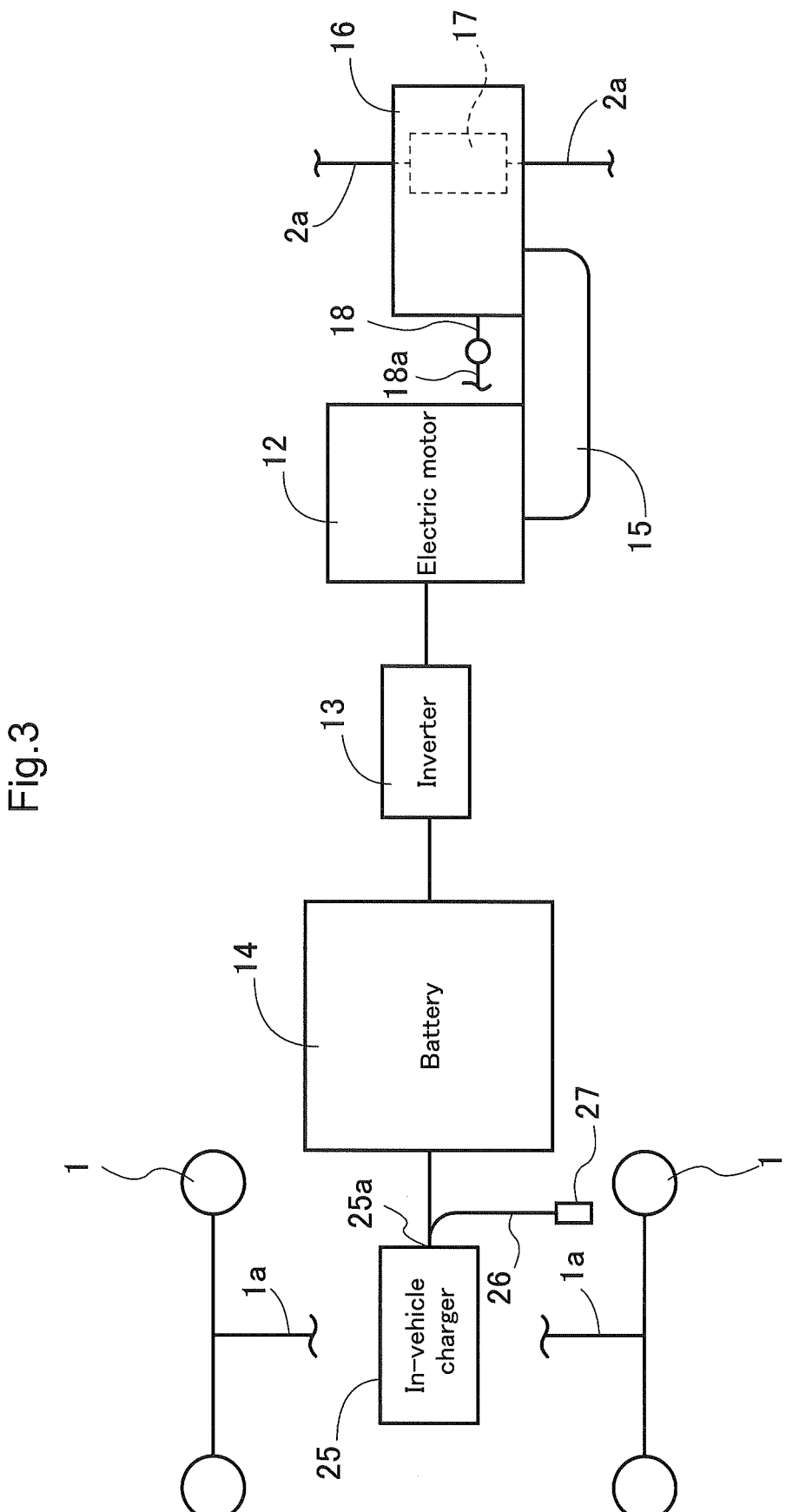
FIG. 3 is a block diagram illustrating a structure for driving front and rear axles.

The embodiment described below is a utility vehicle (which is an example of the "work vehicle"). FIGS. 1 and 2 show arrow F to indicate the forward direction relative to the vehicle body, arrow B to indicate the backward direction relative to the vehicle body, arrow U to indicate the upward direction relative to the vehicle body, and arrow D to indicate the downward direction relative to the vehicle body. The respective front sides of FIGS. 1 and 2 correspond to the leftward direction relative to the vehicle body, whereas their respective back sides correspond to the rightward direction relative to the vehicle body.

Overall Configuration of Utility Vehicle

FIG. 1 illustrates a utility vehicle for multiple purposes such as cargo transport and recreation. The utility vehicle includes a pair of left and right drivable and turnable front wheels 1, a pair of left and right drivable rear wheels 2, and a body 3 supported by the front and rear wheels 1 and 2. The body 3 includes a body frame 4 and a front lid 5. The body frame 4 is at a lower portion of the body 3 and extends in the front-rear direction relative to the body 3. The front lid 5 is at a front portion of the body 3. The utility vehicle includes a pair of left and right front axles 1a holding the respective front wheels 1 and a front-wheel drive case 1b containing the front axles 1a such that the front axles 1a are drivable. The front axles 1a are held by the body frame 4 with the front-wheel drive case 1b in-between. The utility vehicle includes a pair of left and right rear axles 2a supporting the respective rear wheels 2 and a transmission device 16 containing the rear axles 2a. The rear axles 2a are held by the body frame 4 with the transmission device 16 in-between. The utility vehicle includes at a front portion of the body 3 a driver section 6 for a driver to get in. The driver section 6 includes components such as a driver's seat 7, a steering wheel 8 for use to turn the front wheels 1, a dashboard 9, and a roll-over protective structure (ROPS) 10 defining a driver space. The utility vehicle includes a cargo bed 11 disposed rearward of the driver section 6 and supported by the body frame 4.

How Front and Rear Axles are Driven

As illustrated in FIG. 1, the utility vehicle includes below the cargo bed 11 an electric motor 12 as a prime mover, a continuously variable transmission device 15, and a transmission device 16.

As illustrated in FIG. 2, the utility vehicle includes an inverter 13 mounted on the body 3 and connected to the electric motor 12 and a battery 14 mounted on the body 3 and connected to the inverter 13. The electric motor 12 includes an output section (not illustrated in the drawings). The continuously variable transmission device 15 includes an input section (not illustrated in the drawings) coupled to the output section of the electric motor 12 and an output section (not illustrated in the drawings). The transmission device 16 includes an input section (not illustrated in the drawings) coupled to the output section of the continuously variable transmission device 15. The transmission device 16 includes a rear-wheel differential mechanism 17 coupled to the rear axles 2a. The transmission device 16 includes at a front portion a front-wheel output shaft 18. The utility vehicle includes a front-wheel differential mechanism 19 (see FIG. 1) with an input shaft 19a, and also includes a rotary shaft 18a (see FIG. 1). The front-wheel output shaft 18 is coupled to the input shaft 19a with the rotary shaft 18a in-between. The front-wheel differential mechanism 19 is coupled to the front axles 1a and contained in the front-wheel drive case 1b. The continuously variable transmission device 15 is of a belt type for the present embodiment, but may alternatively be another transmission device such as a hydrostatic continuously variable transmission device.

The battery 14 supplies direct-current electric power to the inverter 13, which converts the direct-current electric power into alternating-current electric power. The inverter 13 supplies the alternating-current electric power to the electric motor 12 to drive the electric motor 12. The electric motor 12 transmits motive power to the continuously variable transmission device 15, which adjusts the motive power. The continuously variable transmission device 15 transmits the resulting motive power to the transmission device 16, which converts the motive power into rear-wheel driving force and front-wheel driving force. The transmission device 16 transmits the rear-wheel driving force to the rear-wheel differential mechanism 17, which transmits the rear-wheel driving force to the rear axles 2a. The transmission device 16 transmits the front-wheel driving force through the front-wheel output shaft 18 and the rotary shaft 18a to the front-wheel differential mechanism 19, which transmits the front-wheel driving force to the front axles 1a.

Charging Battery

As illustrated in FIG. 1, the body 3 includes as a front portion a front panel section 20 including a front lid 5 at an upper portion, a dash panel 21 separating the space under the front lid 5 from the driver section 6, and a pair of front side panels 22 at respective left and right side portions of the front panel section 20. The front lid 5 is swingable upward and downward about a swing axis P (see FIG. 1) to be opened and closed. The swing axis P is at a rear portion of the front lid 5 and extends widthwise relative to the body 3.

Figure 4:
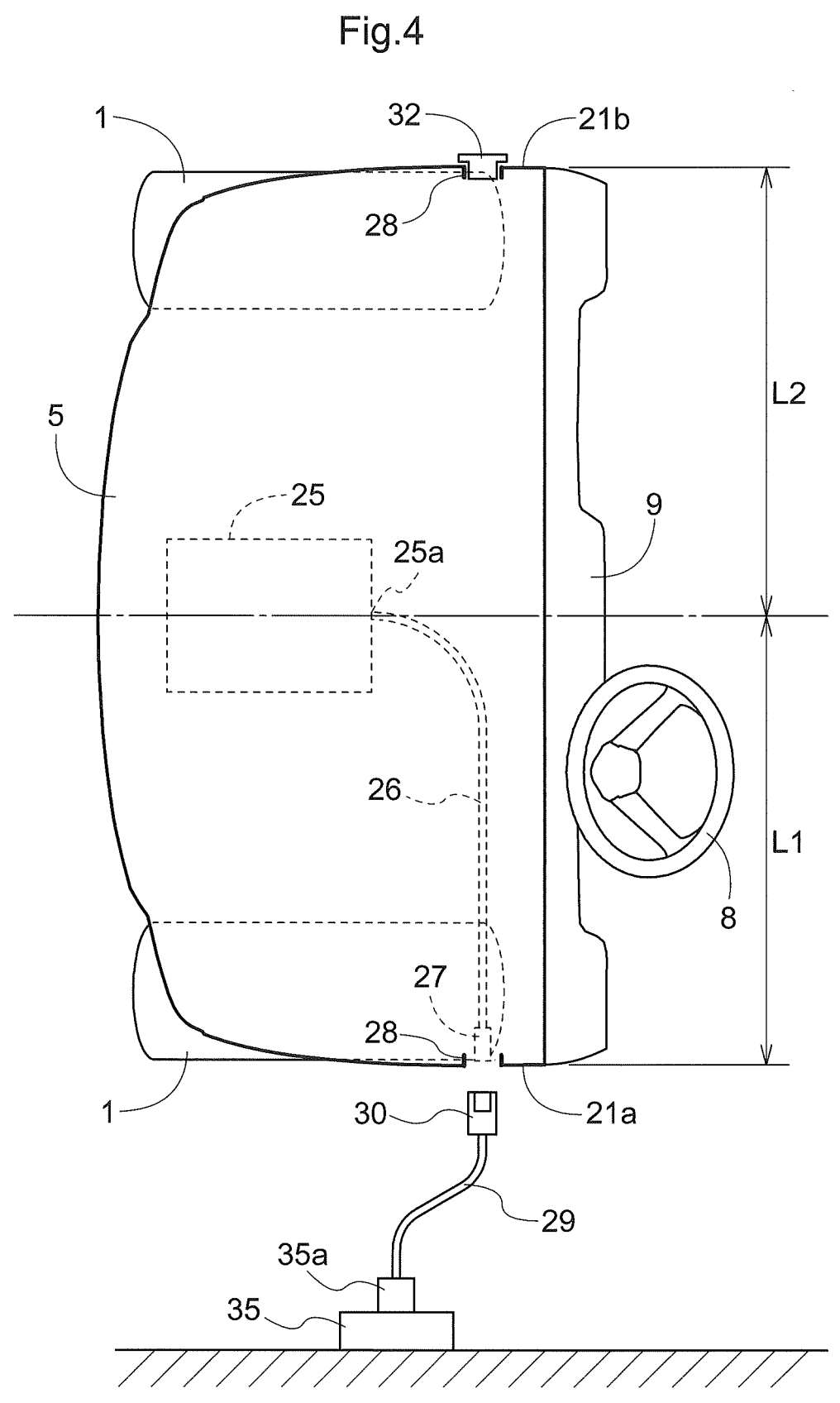

As illustrated in FIGS. 1 and 4, the utility vehicle includes an in-vehicle charger 25 disposed in the space under the front lid 5 and configured to charge the battery 14. The utility vehicle includes an electrically conductive cable 26 that extends from a rear portion of the in-vehicle charger 25 and that is so flexible as to be bendable. The utility vehicle includes an electricity receiving connector 27 connected to that end of the electrically conductive cable 26 which is opposite to the in-vehicle charger 25. The electricity receiving connector 27 is connected to the in-vehicle charger 25 with the electrically conductive cable 26 in-between and is electrically conductive to the in-vehicle charger 25. The electrically conductive cable 26 for the present embodiment is inseparably connected to the in-vehicle charger 25.

As illustrated in FIGS. 1 and 4, the dash panel 21 includes a left section 21a with a charging port 28 at the left side portion of the body 3 and a right section 21b with a charging port 28 at the right side portion of the body 3.

The electricity receiving connector 27 is attachable to and detachable from either charging port 28 inward of the body 3. The utility vehicle is provided with a charging cable 29. With the electricity receiving connector 27 attached to either charging port 28, the charging cable 29 is connectable to and disconnectable from the electricity receiving connector 27 laterally outward of the body 3. The charging cable 29 is provided with a feeding connector 30 connected to an end thereof (see FIG. 4). Connecting the feeding connector 30 to the electricity receiving connector 27 connects the charging cable 29 to the electricity receiving connector 27. Each charging port 28 is provided with a cap 32 (see FIG. 4) attachable to and detachable from the charging port 28 to open and close the charging port 28.

Each charging port 28 is above the upper end 1t of the corresponding front wheel 1 to easily avoid, for example, receiving water when the utility vehicle travels on damp ground or across a puddle.

Each charging port 28 is above the corresponding front wheel 1. This means that the charging ports 28 are so close to the driver section 6 as to allow the driver in the driver section 6 to easily see respective portions of the body 3 in which portions the charging ports 28 are present. Each charging port 28 is above the corresponding front wheel 1 and in an area A within the diameter of the front wheel 1 for the present embodiment, but may alternatively be slightly forward or rearward of the area A.

The in-vehicle charger 25 includes a cable connection portion 25a to which the electrically conductive cable 26 is connectable. As illustrated in FIG. 4, the cable connection portion 25a is apart from the charging port 28 in the left section 21a by a distance L1 and from the charging port 28 in the right section 21b by a distance L2 equal to the distance L1. This allows the utility vehicle to include an electrically conductive cable 26 of such a length that the electrically conductive cable 26 is not excessively loose with the electricity receiving connector 27 attached to either charging port 28.

Figure 5:
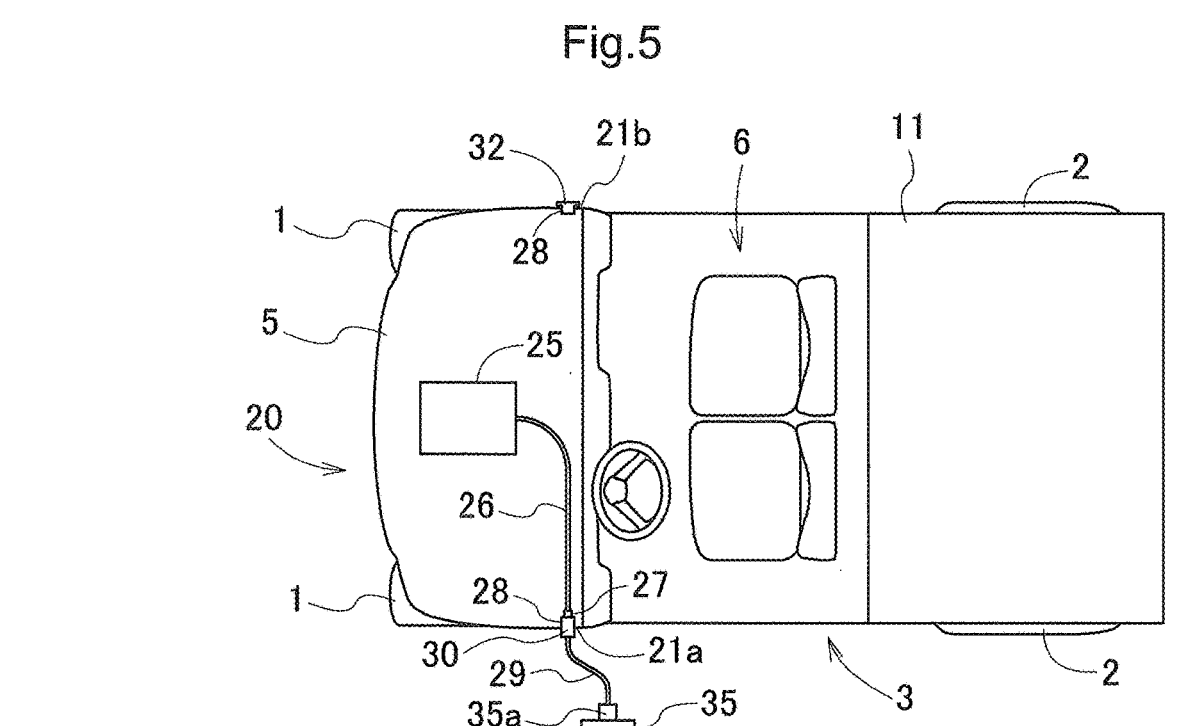
FIG. 5 is a diagram illustrating how a battery is charged.

The battery 14 is rechargeable as follows: As illustrated in FIG. 5, if the driver parks the utility vehicle with a charging stand 35 as an example power source to the left of the body 3, the driver opens the front lid 5, attaches the electricity receiving connector 27 to the charging port 28 in the left section 21a, and removes the corresponding cap 32 to expose the charging port 28. If the electricity receiving connector 27 was attached to the charging port 28 in the right section 21b for storage, the driver removes the electricity receiving connector 27 from the charging port 28 and attaches the electricity receiving connector 27 to the charging port 28 in the left section 21a. The driver then connects the feeding connector 30 of the charging cable 29 to the electricity receiving connector 27 as attached to the charging port 28 in the left section 21a, and connects that end of the charging cable 29 which is opposite to the charging port 28 to a connector 35a of the charging stand 35 to allow the charging stand 35 to supply electric power through the charging cable 29 and the electrically conductive cable 26 to the in-vehicle charger 25.

Figure 6:
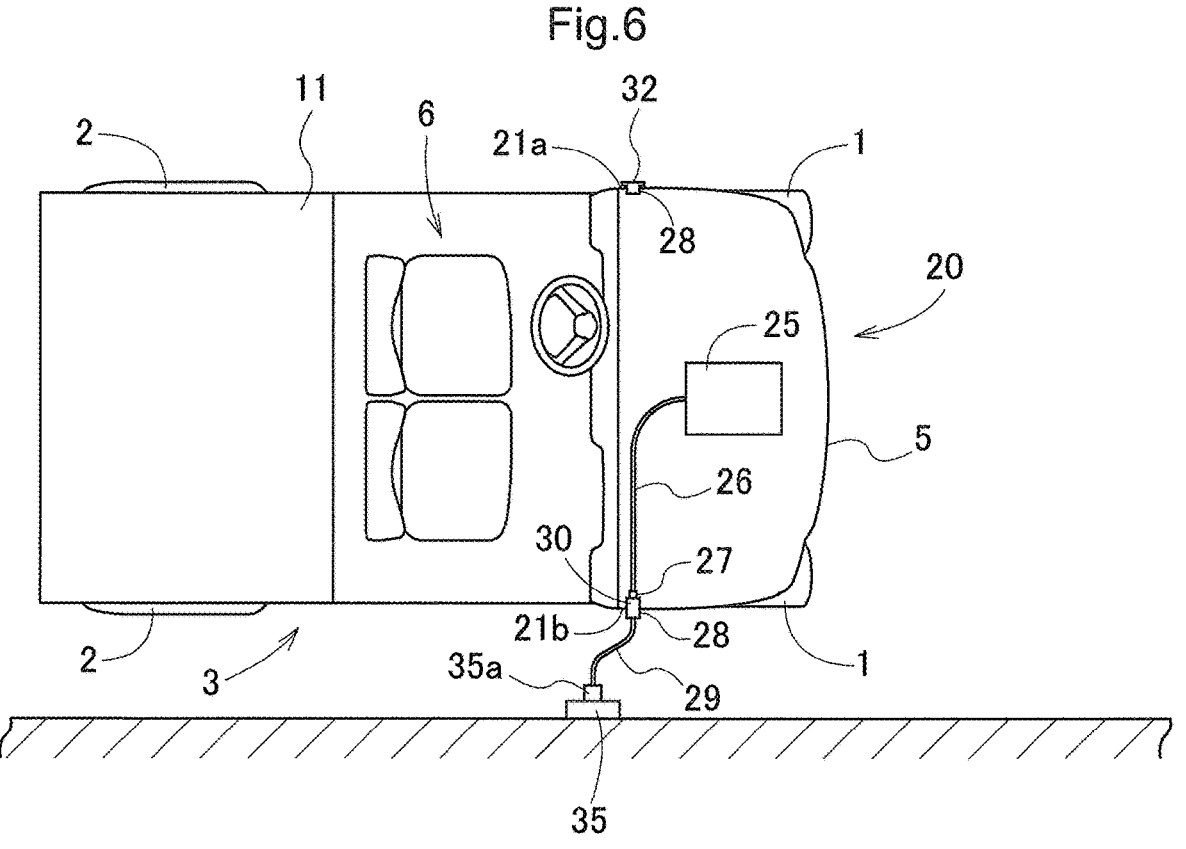
FIG. 6 is a diagram illustrating how a battery is charged.

As illustrated in FIG. 6, if the driver parks the utility vehicle with a charging stand 35 to the right of the body 3, the driver opens the front lid 5, attaches the electricity receiving connector 27 to the charging port 28 in the right section 21b, and removes the corresponding cap 32 to expose the charging port 28. If the electricity receiving connector 27 was attached to the charging port 28 in the left section 21a for storage, the driver removes the electricity receiving connector 27 from the charging port 28 and attaches the electricity receiving connector 27 to the charging port 28 in the right section 21b. The driver then connects the feeding connector 30 of the charging cable 29 to the electricity receiving connector 27 as attached to the charging port 28 in the right section 21b, and connects that end of the charging cable 29 which is opposite to the charging port 28 to a connector 35a of the charging stand 35 to allow the charging stand 35 to supply electric power through the charging cable 29 and the electrically conductive cable 26 to the in-vehicle charger 25.

Tracks (Crawler Travel Devices)

FIG. 2 illustrates a utility vehicle identical to that illustrated in FIG. 1 except that the utility vehicle includes tracks 60 (crawler travel devices) attached to the front and rear axles 1a and 2a instead of the front and rear wheels 1 and 2.

As illustrated in FIG. 2, the front and rear axles 1a and 2a are each provided with a track 60 including (i) a drive wheel 61, (ii) a front guide wheel 62 in a forward and downward direction from the drive wheel 61, (iii) a rear guide wheel 63 in a rearward and downward direction from the drive wheel 61, (iv) two or more ground wheels 64 disposed between the front and rear guide wheels 62 and 63 and arranged in the front-rear direction, and (v) a crawler belt 65 wound around the drive wheel 61, the front guide wheel 62, the ground wheels 64, and the rear guide wheel 63. The crawler belt 65 for the present embodiment is made of rubber. The track 60 includes a track frame 66 holding the front guide wheel 62, the ground wheels 64, and the rear guide wheel 63 in such a manner that the front guide wheel 62, the ground wheels 64, and the rear guide wheel 63 are each rotatable. The rear guide wheel 63 is a tension wheel. The track 60 includes two support poles 67 arranged in the front-rear direction and extending upward from the track frame 66. The drive wheel 61 is supported by respective upper portions of the support poles 67 in such a manner as to be rotatable. The drive wheel 61 is also detachably attached to the corresponding front axle 1a or rear axle 2a in such a manner as to be rotatable integrally with the corresponding front axle 1a or rear axle 2a. The track frame 66 is held by the corresponding front axle 1a or rear axle 2a with the support poles 67 and the drive wheel 61 in-between.

Attaching and detaching the drive wheel 61 to and from the corresponding front axle 1a or rear axle 2a attaches and detaches the track 60 to and from the corresponding front axle 1a or rear axle 2a. The track 60 is configured such that the drive wheel 61 is driven by the corresponding front axle 1a or rear axle 2a and that the crawler belt 65 is driven by the drive wheel 61.

Structure for Driving Wheels and Tracks

Figure 7:
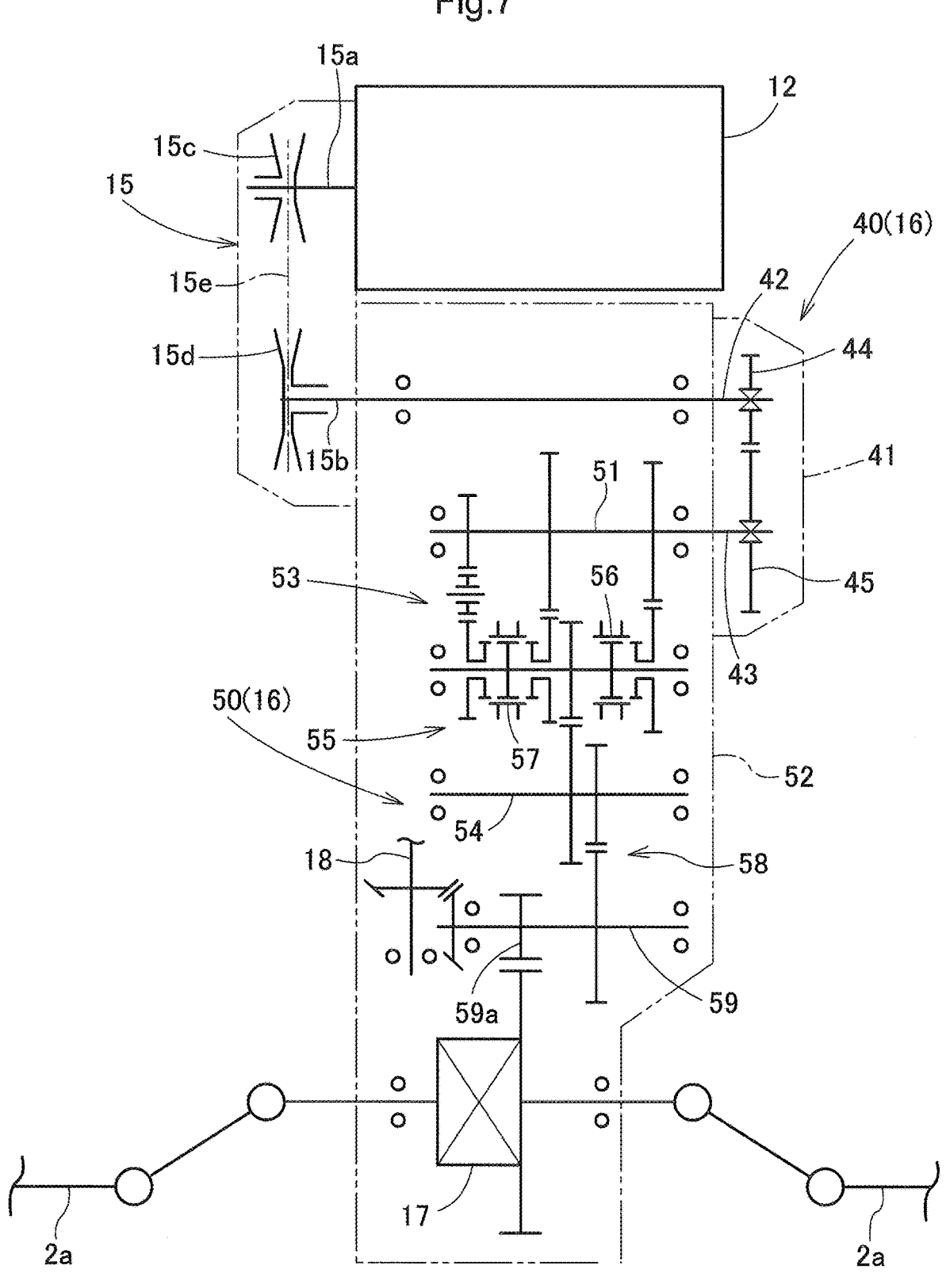
FIG. 7 is a diagram schematically illustrating a structure for driving wheels and tracks.

The continuously variable transmission device 15 includes an input shaft 15a and an output shaft 15b. As illustrated in FIG. 7, The continuously variable transmission device 15 receives motive power from the electric motor 12 at the input shaft 15a, adjusts the rotation speed of the motive power steplessly, and outputs the resulting motive power from the output shaft 15b. The continuously variable transmission device 15 for the present embodiment is of a belt type including components such as an input split pulley 15c with an adjustable belt winding diameter, an output split pulley 15d with an adjustable belt winding diameter, and an endless belt 15e.

As illustrated in FIG. 7, the transmission device 16 includes a motive power transmission system configured to receive motive power from the electric motor 12 through the continuously variable transmission device 15, adjust the motive power, and transmit the resulting motive power to the front and rear axles 1a and 2a. The transmission device 16 includes a first transmission section 40 and a second transmission section 50 connected to each other in series in the motive power transmission system. The present embodiment is configured such that the first transmission section 40 is upstream of the second transmission section 50 in the power transmission direction. The present invention is, however, not limited to such a configuration. The first transmission section 40 may alternatively be downstream of the second transmission section 50 in the power transmission direction.

Figure 8:
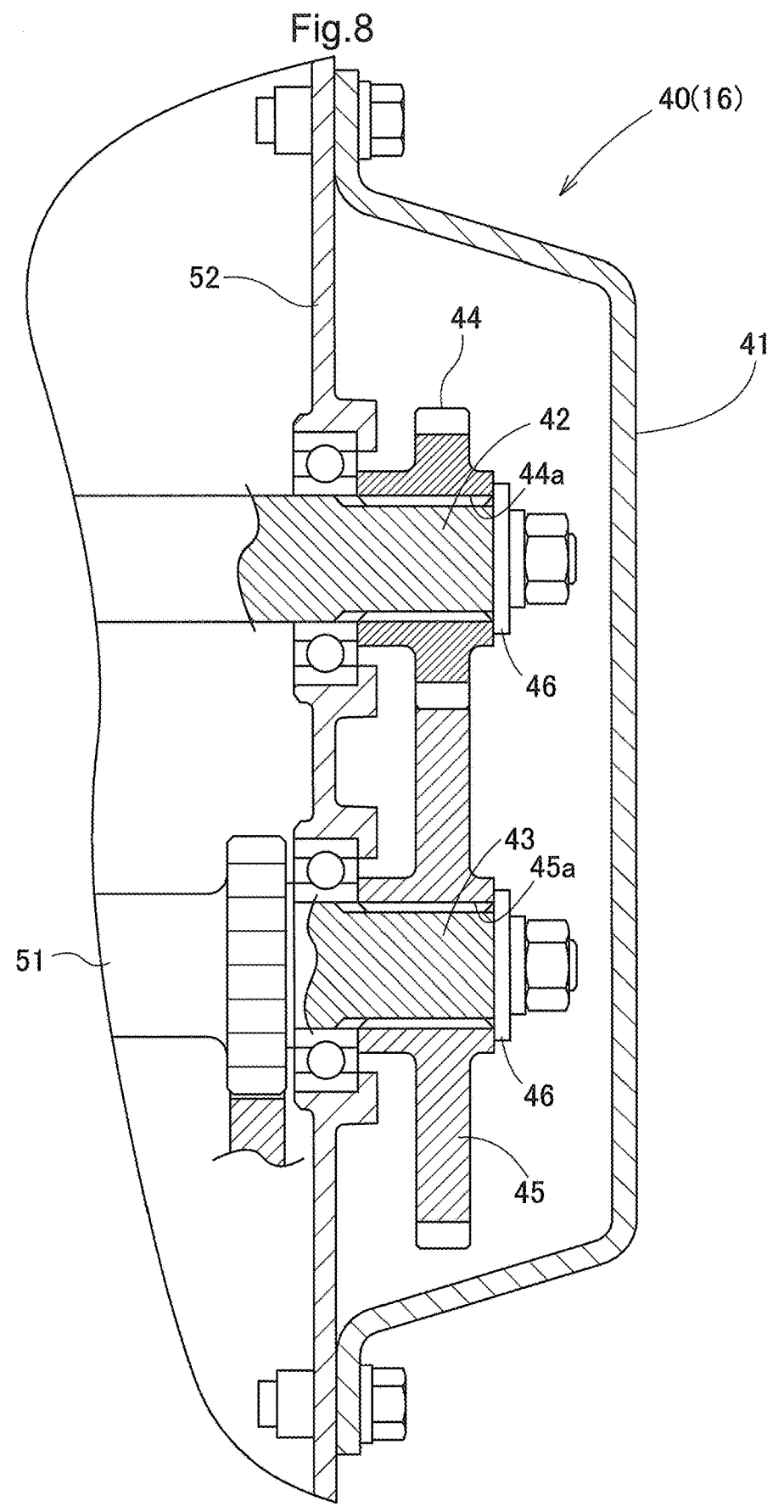
FIG. 8 is a cross-sectional view of a first transmission section in a decelerating power transmission mode.

As illustrated in FIGS. 7 and 8, the transmission device 16 includes a first transmission case 41 and a second transmission case 52. The first transmission section 40 includes a first transmission case 41, and also includes in the first transmission case 41 a first power transmission shaft 42, a second power transmission shaft 43, a first power transmission wheel 44, and a second power transmission wheel 45.

The first power transmission shaft 42 is parallel to the second power transmission shaft 43. The first power transmission shaft 42 is coupled to the output shaft 15b of the continuously variable transmission device 15. The second power transmission shaft 43 is coupled to an input shaft 51 of the second transmission section 50. The first power transmission shaft 42 is upstream of the second power transmission shaft 43 in the power transmission direction. The second power transmission shaft 43 is downstream of the first power transmission shaft 42 in the power transmission direction.

The first power transmission wheel 44 is attachable to and detachable from the first power transmission shaft 42. The second power transmission wheel 45 is attachable to and detachable from the second power transmission shaft 43. Specifically, as illustrated in FIG. 8, the first power transmission wheel 44 has a spline hole 44a, whereas the second power transmission wheel 45 has a spline hole 45a. The first transmission section 40 includes a pair of stopper rings 46 each attachable to and detachable from a corresponding one of the first and second power transmission shafts 42 and 43. The first and second power transmission shafts 42 and 43 include respective spline shafts. Removing either stopper ring 46 allows the corresponding spline shaft to be pulled out of the corresponding spline hole 44a or 45a and then inserted into the corresponding spline hole 44a or 45a. The first power transmission wheel 44 is configured to become coupled to the first power transmission shaft 42 through spline engagement in such a manner as to be rotatable integrally with the first power transmission shaft 42. The second power transmission wheel 45 is configured to become coupled to the second power transmission shaft 43 through spline engagement in such a manner as to be rotatable integrally with the second power transmission shaft 43. The first and second power transmission wheels 44 and 45 are engageable with each other in an interlocked manner and disengageable from each other. The second power transmission wheel 45 has an outer diameter larger than that of the first power transmission wheel 44. The present embodiment is configured such that the first power transmission wheel 44 serves as a first gear and that the second power transmission wheel 45 serves as a second gear. The first and second gears are engageable with and disengageable from each other. The second gear has an outer diameter larger than that of the first gear.

Figure 9:
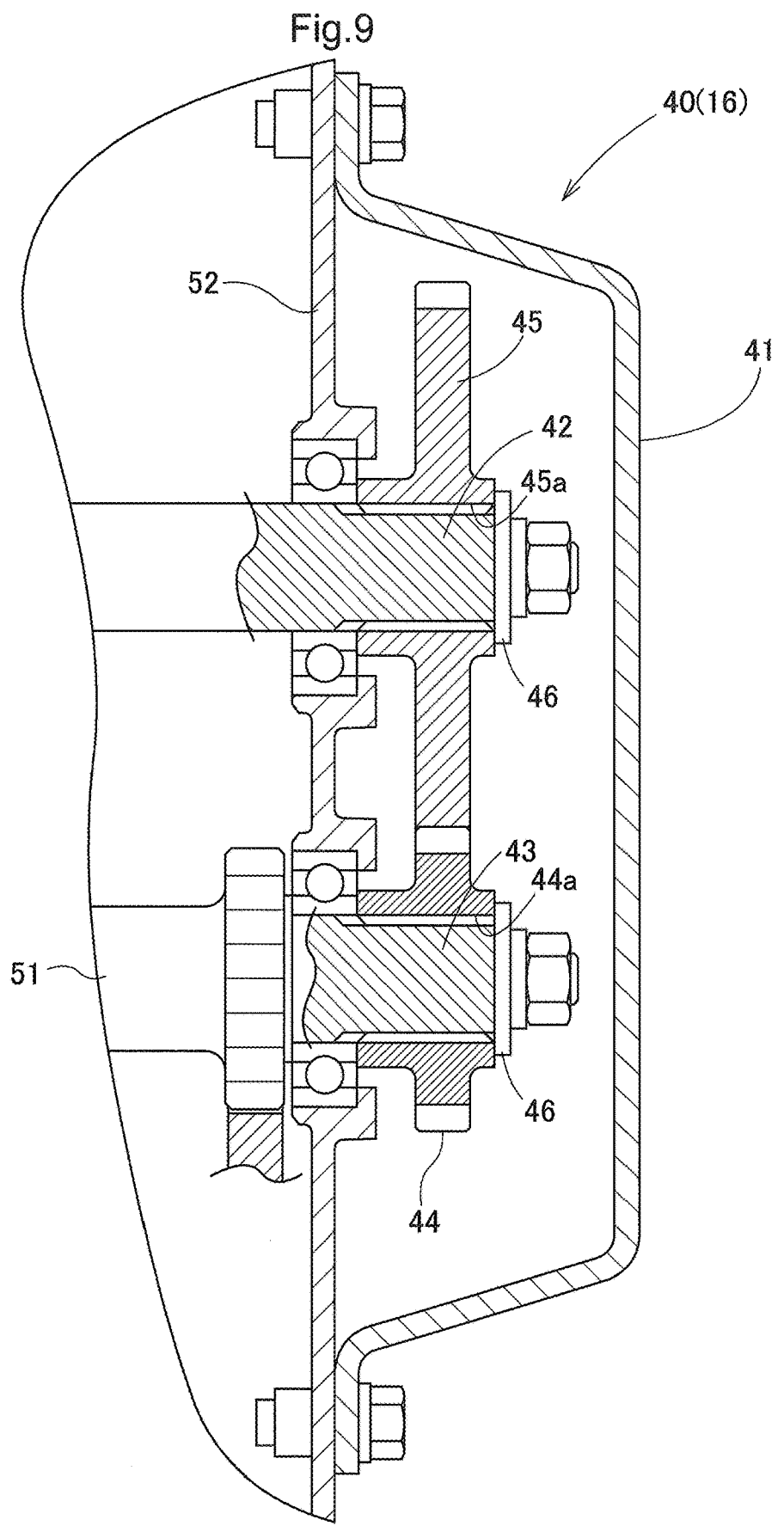
FIG. 9 is a cross-sectional view of a first transmission section in an accelerating power transmission mode.

The first transmission section 40 is, as illustrated in FIG. 8, configured such that attaching the first power transmission wheel 44 to the first power transmission shaft 42 and the second power transmission wheel 45 to the second power transmission shaft 43 achieves a decelerating power transmission mode, in which the first and second power transmission wheels 44 and 45 decrease the motive power transmitted from the first power transmission shaft 42 to the second power transmission shaft 43. The first transmission section 40 is, as illustrated in FIG. 9, configured such that attaching the second power transmission wheel 45 to the first power transmission shaft 42 and the first power transmission wheel 44 to the second power transmission shaft 43 achieves an accelerating power transmission mode, in which the first and second power transmission wheels 45 and 44 increase the motive power transmitted from the first power transmission shaft 42 to the second power transmission shaft 43. The first transmission section 40 is switchable between the decelerating power transmission mode and the accelerating power transmission mode in response to the first and second power transmission wheels 44 and 45 being switched between the first and second power transmission shafts 42 and 43.

As illustrated in drawings such as FIG. 8, the first transmission case 41 is separate from the second transmission case 52 and is detachably attachable to the second transmission case 52. The first transmission case 41 for the present embodiment is detachably attachable to a lateral side portion of the second transmission case 52. The first transmission case 41 is detachably attachable to the second transmission case 52 with use of coupling bolts.

Detaching the first transmission case 41 from the second transmission case 52 to open the first transmission case 41 allows the first and second power transmission wheels 44 and 45 to be switched between the first and second power transmission shafts 42 and 43. Attaching the first transmission case 41 to the second transmission case 52 closes the first transmission case 41.

As illustrated in FIG. 7, the second transmission section 50 includes a second transmission case 52, and also includes a transmission mechanism 53 in the second transmission case 52. As illustrated in FIG. 7, the transmission mechanism 53 includes an input shaft 51 coupled to the second power transmission shaft 43 of the first transmission section 40, an output shaft 54 parallel to the input shaft 51, and a gear-based transmission section 55 extending from the input shaft 51 to the output shaft 54 and including a shiftable first shift gear 56 and a shiftable second shift gear 57.

The second transmission section 50 is configured to, in response to the first and second shift gears 56 and 57 being shifted appropriately, be switched between a first-gear forward-travel mode, a second-gear forward-travel mode, and a rearward-travel mode. In the first-gear forward-travel mode, the second transmission section 50 receives motive power from the first transmission section 40 at the input shaft 51, causes the gear-based transmission section 55 to adjust the motive power into first-gear forward-travel motive power, and outputs the first-gear forward-travel motive power from the output shaft 54. In the second-gear forward-travel mode, the second transmission section 50 receives motive power from the first transmission section 40 at the input shaft 51, causes the gear-based transmission section 55 to adjust the motive power into second-gear forward-travel motive power with a speed higher than that of the first-gear forward-travel motive power, and outputs the second-gear forward-travel motive power from the output shaft 54. In the rearward-travel mode, the second transmission section 50 receives motive power from the first transmission section 40 at the input shaft 51, causes the gear-based transmission section 55 to adjust the motive power into rearward-travel motive power, and outputs the rearward-travel motive power from the output shaft 54. The second-gear forward-travel mode allows a maximum speed for forward travel.

As illustrated in FIG. 7, the driving structure includes a gear mechanism 58, a relay shaft 59, and a power transmission gear 59*a*. The relay shaft 59 is coupled to the output shaft 54 with the gear mechanism 58 in-between and to the rear-wheel differential mechanism 17 with the power transmission gear 59*a* in-between. The second transmission section 50 transmits motive power from the output shaft 54 through the relay shaft 59 to the rear-wheel differential mechanism 17, which transmits the motive power to the rear axles 2*a*.

The second transmission section 50 also transmits motive power from the output shaft 54 through the relay shaft 59 to the front-wheel output shaft 18 (see FIG. 2) protruding forward from the second transmission case 52. The front-wheel output shaft 18 transmits the motive power through the rotary shaft 18*a* (see FIG. 1) to the front-wheel differential mechanism 19 (see FIG. 1), which transmits the motive power to the front axles 1*a*.

The transmission device 16 is switchable into (i) a first high-speed power-transmitting mode in response to the first transmission section 40 being switched into the accelerating power transmission mode and the second transmission section 50 being switched into the second-gear forward-travel mode (which allows a maximum speed) and (ii) a second high-speed power-transmitting mode in response to the first transmission section 40 being switched into the decelerating power transmission mode and the second transmission section 50 being switched into the second-gear forward-travel mode (which allows a maximum speed). In the first high-speed power-transmitting mode, the front and rear axles 1*a* and 2*a* each have a drive rate V1, whereas in the second high-speed power-transmitting mode, the front and rear axles 1*a* and 2*a* each have a drive rate V2, the drive rate V1 being higher than the drive rate V2.

With the tracks 60 attached to the front and rear axles 1*a* and 2*a*, switching the transmission device 16 into the first high-speed power-transmitting mode allows the utility vehicle to travel forward at a maximum travel speed corresponding to the drive rate V1 of the front and rear axles 1*a* and 2*a*. With the front and rear wheels 1 and 2 attached to the front and rear axles 1*a* and 2*a*, switching the transmission device 16 into the second high-speed power-transmitting mode allows the utility vehicle to travel forward at a maximum travel speed corresponding to the drive rate V2 of the front and rear axles 1*a* and 2*a*. The drive wheel 61 of each track 60 has an outer diameter smaller than that of each of the front and rear wheels 1 and 2. If the utility vehicle were, in traveling with use of the tracks 60, merely capable of driving the front and rear axles 1*a* and 2*a* at a maximum speed equal to that for the case of traveling with use of the front and rear wheels 1 and 2, the utility vehicle would only be capable of traveling at a maximum travel speed lower than that for the case of traveling with use of the front and rear wheels 1 and 2. In view of that, the transmission device 16 is configured such that the drive rates V1 and V2 differ from each other by a predetermined difference V that allows the maximum travel speed for the case of traveling with use of the tracks 60 to be equal or substantially equal to the maximum travel speed for the case of traveling with use of the front and rear wheels 1 and 2.

The above configuration allows the transmission device 16 to, with the front and rear wheels 1 and 2 attached, be switched into the second high-speed power-transmitting mode for driving the front and rear wheels 1 and 2 and, with the tracks 60 attached instead of the front and rear wheels 1 and 2, be switched into the first high-speed power-transmitting mode for driving the tracks 60. This in turn allows the utility vehicle to, in traveling with use of the tracks 60, travel at a maximum travel speed equal or substantially equal to that for the case of traveling with use of the front and rear wheels 1 and 2.

If the utility vehicle is capable of traveling at a restricted maximum travel speed with the front and rear wheels 1 and 2 attached and the transmission device 16 in the second high-speed power-transmitting mode, switching the transmission device 16 into the first high-speed power-transmitting mode allows the utility vehicle to, even with the tracks 60 attached, travel at a maximum travel speed equal or substantially equal to the restricted maximum travel speed.

Figure 10:
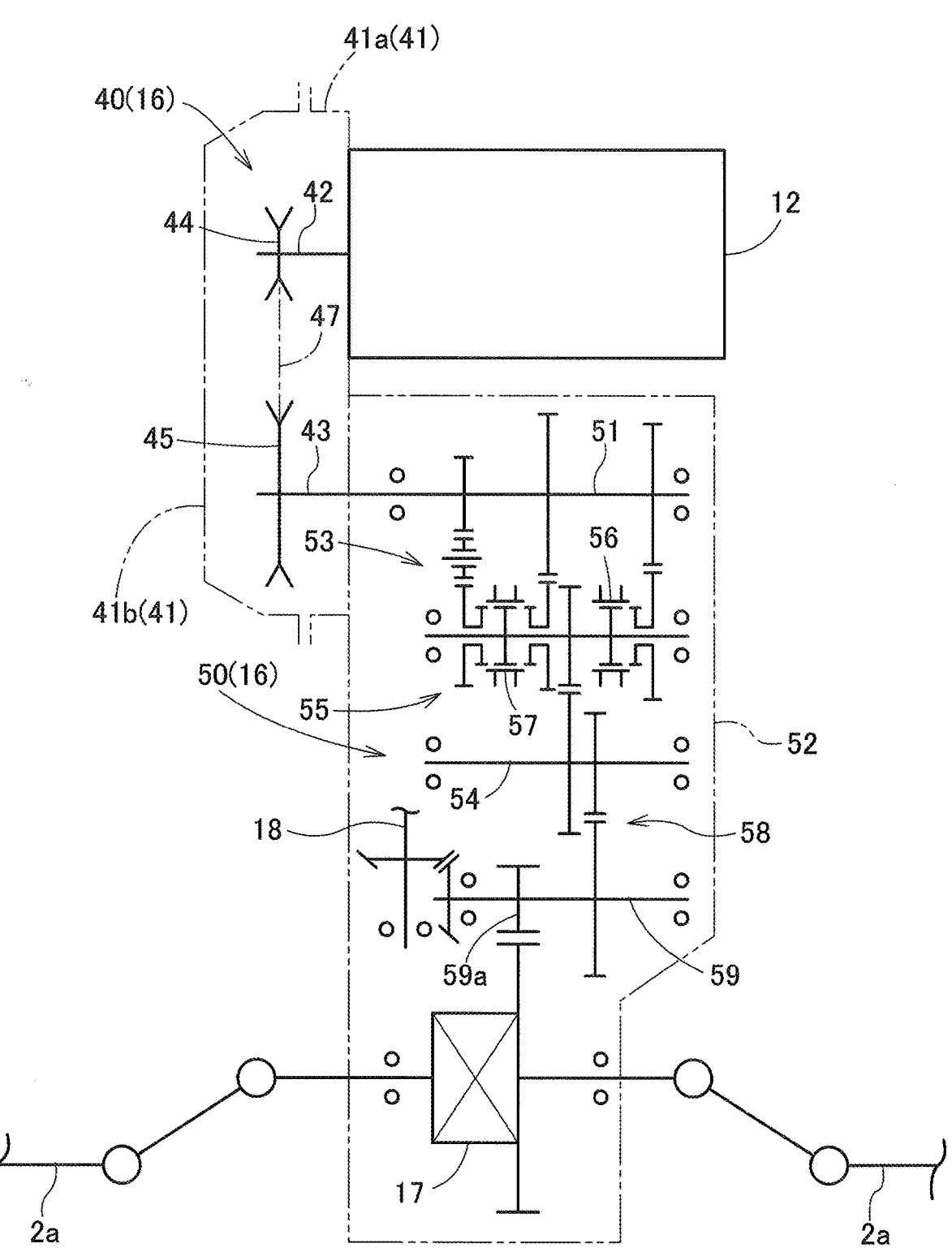
FIG. 10 is a diagram schematically illustrating a structure for driving wheels and tracks for an alternative embodiment.
Figure 11:
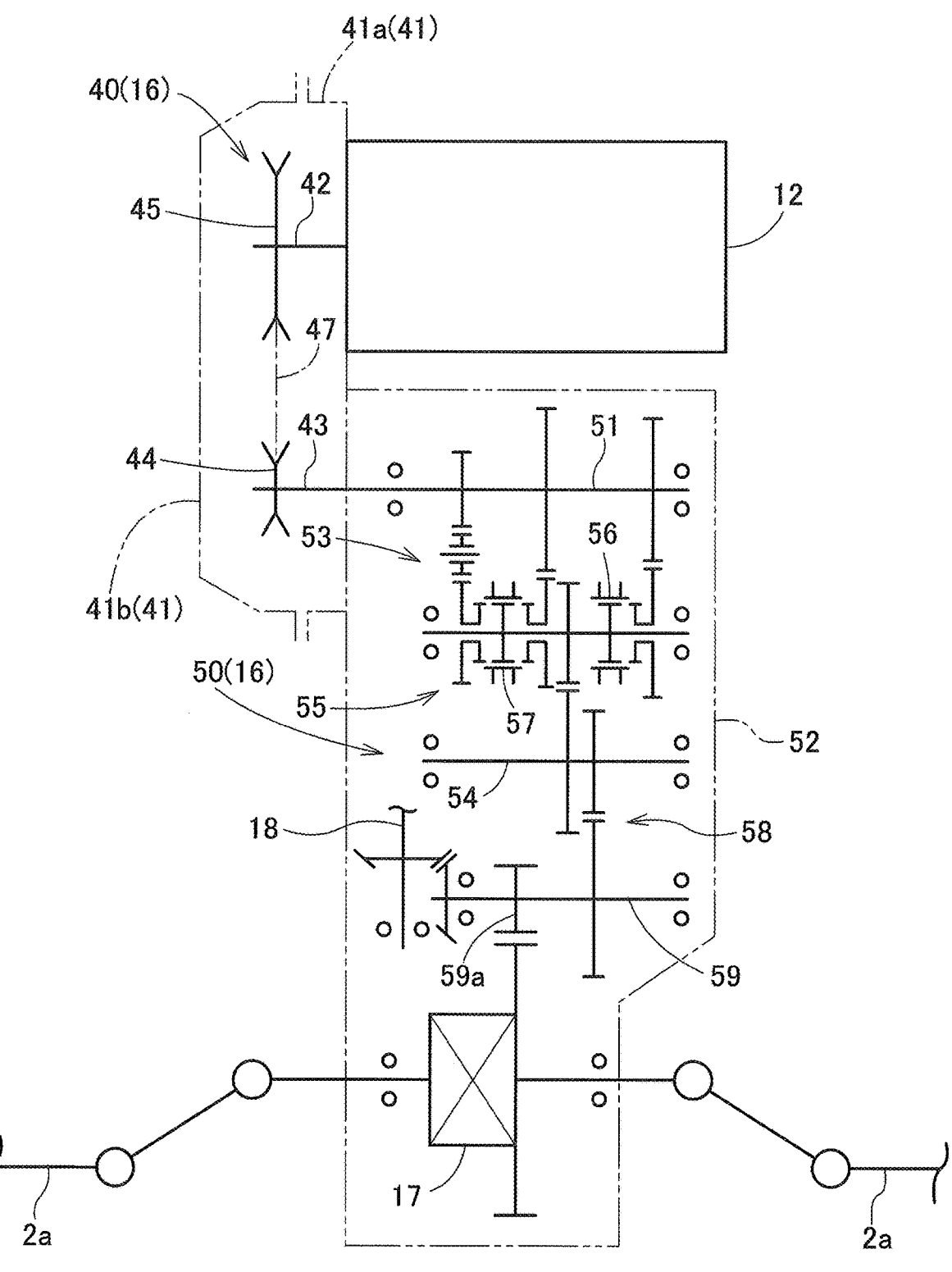
FIG. 11 is a diagram schematically illustrating a structure for driving wheels and tracks for an alternative embodiment.

Alternative Embodiments (1) FIGS. 10 and 11 are each a diagram schematically illustrating a structure for driving wheels and tracks for an alternative embodiment. The driving structure is configured such that the first transmission section 40 includes a first belt pulley as the first power transmission wheel 44, a second belt pulley as the second power transmission wheel 45 with an outer diameter larger than that of the first belt pulley, and an endless belt 47 wound around the first and second power transmission wheels 44 and 45 and configured to move the first and second power transmission wheels 44 and 45 together.

The first transmission section 40 is, as illustrated in FIG. 10, configured such that attaching the first power transmission wheel 44 to the first power transmission shaft 42 and the second power transmission wheel 45 to the second power transmission shaft 43 and winding the endless belt 47 around the first and second power transmission wheels 44 and 45 achieves a decelerating power transmission mode, in which the first power transmission wheel 44, the endless belt 47, and the second power transmission wheel 45 decrease the motive power transmitted from the first power transmission shaft 42 to the second power transmission shaft 43. The first transmission section 40 is, as illustrated in FIG. 11, configured such that attaching the first power transmission wheel 45 to the second power transmission shaft 42 and the first power transmission wheel 44 to the second power transmission shaft 43 and winding the endless belt 47 around the first and second power transmission wheels 44 and 45 achieves an accelerating power transmission mode, in which the second power transmission wheel 45, the endless belt 47, and the first power transmission wheel 44 increase the motive power transmitted from the first power transmission shaft 42 to the second power transmission shaft 43.

The first transmission case 41 of the first transmission section 40 includes a fixed case section 41*a* attached to the electric motor 12 and the second transmission case 52 and an open/close case section 41*b* attachable to and detachable from the fixed case section 41*a*. Detaching the open/close case section 41*b* from the fixed case section 41*a* to open the open/close case section 41*b* allows the first and second power transmission wheels 44 and 45 to be switched between the first and second power transmission shafts 42 and 43.

(2) The embodiment described above includes an electric motor 12 as a prime mover. The prime mover may alternatively be an engine or a combination of an engine and an electric motor.

(3) The embodiment described above is configured such that the first transmission section 40 is connected to the second transmission section 50 and upstream thereof in the power transmission direction. The first transmission section 40 may alternatively be connected to the second transmission section 50 and downstream thereof in the power transmission direction.

(4) The embodiment described above is configured such that the second transmission section 50 is switchable between two forward-travel modes, namely, the first-gear and second-gear forward-travel modes. The present invention is, however, not limited to such a configuration. The second transmission section 50 may be switchable between three or more forward-travel modes.

(5) The embodiment described above is configured such that the first transmission case 41 is separate from the second transmission case 52. The embodiment may be altered such that the first transmission case 41 is integral with the second transmission case 52 and that the transmission case has an opening through which to switch the first and second power transmission wheels 44 and 45 between the first and second power transmission shafts 42 and 43.

INDUSTRIAL APPLICABILITY

The present invention is applicable to utility vehicles as well as other various work vehicles such as tractors and rice transplanters.

REFERENCE SIGNS LIST

1*a* Front axle (axle)
2*a* Rear axle (axle)
12 Electric motor (prime mover)
16 Transmission device
40 First transmission section
41 First transmission case
42 First power transmission shaft
43 Second power transmission shaft
44 First power transmission wheel
45 Second power transmission wheel
50 Second transmission section
52 Second transmission case
47 Endless belt

The invention claimed is:

1. A work vehicle, comprising:
a prime mover;
a continuously variable transmission device comprised of an input shaft, an output shaft, an input pulley, an output pulley, and an endless belt;
a transmission device configured to receive motive power from the prime mover via the continuously variable transmission device, adjust the motive power, and output the motive power as adjusted; and
an axle drivable by the motive power from the transmission device,
the transmission device comprising a first transmission section and a second transmission section connected to each other in series in a motive power transmission system for transmitting the motive power from the prime mover to the axle,
the first transmission section comprising:
a first power transmission shaft upstream in a motive power transmission direction;
a second power transmission shaft downstream in the motive power transmission direction; and
a first power transmission wheel and a second power transmission wheel each detachably attachable to each of the first power transmission shaft and the second power transmission shaft, and
wherein:
the first transmission section is switchable (i) in response to the first power transmission wheel being attached to the first power transmission shaft and the second power transmission wheel being attached to the second power transmission shaft, into a decelerating power transmission mode in which the first power transmission wheel and the second power transmission wheel decrease motive power transmitted from the first power transmission shaft to the second power transmission shaft and (ii) in response to the first power transmission wheel being attached to the second power transmission shaft and the second power transmission wheel being attached to the first power transmission shaft, into an accelerating power transmission mode in which the first power transmission wheel and the second power transmission wheel increase the motive power transmitted from the first power transmission shaft to the second power transmission shaft,
the transmission device is switchable into (i) a first maximum speed power transmission mode in which the first transmission section is in the accelerating power transmission mode, and the second transmission section is in a transmission mode for a maximum speed and (ii) a second maximum speed power transmission mode in which the first transmission section is in the decelerating power transmission mode, and the second transmission section is in the transmission mode for a maximum speed, and
the transmission device is configured to, in the first maximum speed power transmission mode, cause the axle to be driven at a first drive rate and, in the second maximum speed power transmission mode, cause the axle to be driven at a second drive rate, the first drive rate is higher than the second drive rate.

2. The work vehicle according to claim 1, wherein:
the first transmission section comprises a first transmission case containing the first power transmission wheel and the second power transmission wheel, and
the second transmission section comprises a second transmission section separate from the first transmission case.

3. The work vehicle according to claim 1, wherein:

the first power transmission wheel is a first gear, and the second power transmission wheel is a second gear engageable with the first gear and having an outer diameter larger than an outer diameter of the first gear.

4. The work vehicle according to claim 1, wherein:

the first power transmission wheel is a first belt pulley, and the second power transmission wheel is a second belt pulley coupled to the first belt pulley with use of an endless belt and having an outer diameter larger than an outer diameter of the first belt pulley.

* * * * *